United States Patent
Kore et al.

(10) Patent No.: US 9,295,066 B2
(45) Date of Patent: Mar. 22, 2016

(54) METHOD OF COEXISTENCE OF MULTIPLE WIRELESS FIRE SYSTEMS

(71) Applicant: Honeywell Intrnational Inc., Morristown, NJ (US)

(72) Inventors: Vinayak Sadashiv Kore, Karnataka (IN); Sameer Bansal, Karnataka (IN); Gourav Sharma, Karnatak (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 80 days.

(21) Appl. No.: 14/100,241

(22) Filed: Dec. 9, 2013

(65) Prior Publication Data

US 2015/0163814 A1 Jun. 11, 2015

(51) Int. Cl.
*H04W 72/08* (2009.01)
*H04W 72/04* (2009.01)
*H04B 1/7143* (2011.01)
*H04W 4/00* (2009.01)

(52) U.S. Cl.
CPC ........... *H04W 72/082* (2013.01); *H04B 1/7143* (2013.01); *H04W 72/0446* (2013.01); *H04W 72/0453* (2013.01); *H04W 4/006* (2013.01)

(58) Field of Classification Search
CPC ............ H04L 12/40091; H04L 12/462; H04L 12/40097; H04L 12/4625; H04B 1/713; H04B 1/71; H04W 88/16; H04W 92/06

USPC .................. 370/252–253, 241–242, 310–350
See application file for complete search history.

(56) References Cited

U.S. PATENT DOCUMENTS

| | | | | |
|---|---|---|---|---|
| 5,394,433 | A * | 2/1995 | Bantz et al. | 375/132 |
| 5,583,886 | A * | 12/1996 | Rohani et al. | 375/227 |
| 6,549,784 | B1 * | 4/2003 | Kostic et al. | 455/501 |
| 6,826,607 | B1 * | 11/2004 | Gelvin et al. | 709/224 |
| 2006/0203707 | A1 * | 9/2006 | Lee et al. | 370/208 |
| 2009/0080498 | A1 * | 3/2009 | Deisher et al. | 375/136 |
| 2010/0034239 | A1 * | 2/2010 | Keshavarzian et al. | 375/134 |
| 2010/0272093 | A1 * | 10/2010 | Raravi et al. | 370/348 |
| 2011/0128900 | A1 * | 6/2011 | Seok | 370/311 |
| 2011/0255570 | A1 * | 10/2011 | Fujiwara | 375/133 |
| 2012/0163352 | A1 * | 6/2012 | Bansal et al. | 370/338 |

* cited by examiner

*Primary Examiner* — Warner Wong
(74) *Attorney, Agent, or Firm* — Husch Blackwell LLP

(57) ABSTRACT

A method and apparatus are provided, the method incorporating the steps of detecting other interfering wireless gateways of the security system, their frequency hopping pattern, their phase relative to a time reference and a dwell time relative to the time reference, selecting a channel set and a phase of operation for communicating with a plurality of sensors relative to the time reference using frequency hopping based upon the detected frequency hopping pattern, the phase and dwell time of the other wireless gateways, communicating with the plurality of sensors and periodically comparing its phase of operation with the phase of the other interfering wireless gateways and adjusting its phase based upon the comparison with the phase of the other interfering wireless gateways.

20 Claims, 3 Drawing Sheets

Synchronized FH Scheme A-
Common Frequency Hopping Pattern

- Example of Multiple GWs co-existing:
- FH Pattern: {{7,14},{12,22},{10,24},{11,19},{4,15},{6,21},{9,13},{5,18}, {0,20},{2,23},{3,17},{8,25},{1,16}}

| F | 0 | 1 | 2 | 3 | 4 | 5 | 6 | 7 | 8 | 9 | 10 | 11 | 12 |
|---|---|---|---|---|---|---|---|---|---|---|----|----|----|
| N1 | 7 | 14 | 12 | 22 | 10 | 24 | 11 | 19 | 4 | 15 | 6 | 21 | 9 | 13 | 5 | 18 | 0 | 20 | 2 | 23 | 3 | 17 | 8 | 25 | 1 | 16 |
| N2 | 11 | 19 | 4 | 15 | 6 | 21 | 9 | 13 | 5 | 18 | 0 | 20 | 2 | 23 | 3 | 17 | 8 | 25 | 1 | 16 | 7 | 14 | 12 | 22 | 10 | 24 |
| N3 | 9 | 13 | 5 | 18 | 0 | 20 | 2 | 23 | 3 | 17 | 8 | 25 | 1 | 16 | 7 | 14 | 12 | 22 | 10 | 24 | 11 | 19 | 4 | 15 | 6 | 21 |
| N4 | 2 | 23 | 3 | 17 | 8 | 25 | 1 | 16 | 7 | 14 | 12 | 22 | 10 | 24 | 11 | 19 | 4 | 15 | 6 | 21 | 9 | 13 | 5 | 18 | 0 | 20 |

→ Network 1 starts with seed 0
→ Network 2 starts with seed 3
→ Network 3 starts with seed 6
→ Network 4 starts with seed 9

Seed spacing allows for synchronization error
Min Seed spacing- 2, Max Seed spacing -3

*FIG. 3*

Synchronized FH Scheme B-
Hybrid Multiple FH Patterns

• Example:
  - Set A: {0,12}, Set B: {13,25}
  - Master FH Pattern: {{7,14},{12,22},{10,24},{11,19},{4,15},{6,21},{9,13},{5,18},
    {0,20},{2,23},{3,17},{8,25},{1,16}}

• Interleaving between Sets A and B is done for better noise immunity e.g. for Walkie-Talkie, etc.

| F   | 0  | 1  | 2  | 3  | 4  | 5  | 6 | 7  | 8  | 9  | 10 | 11 | 12 |
|-----|----|----|----|----|----|----|---|----|----|----|----|----|----|
| N1  | 7  | 14 | 22 | 12 | 10 | 24 | 11 | 19 | 4  | 15 | 6  | 21 | 9  | 13 | 5  | 18 | 0  | 20 | 2  | 23 | 3  | 17 | 8  | 25 | 1  | 16 |
| N2  | 7  | 22 | 12 | 19 | 10 | 21 | 11 | 18 | 4  | 23 | 6  | 25 | 9  | 14 | 5  | 24 | 0  | 15 | 2  | 13 | 3  | 20 | 8  | 17 | 1  | 26 |
| N3  | 7  | 24 | 12 | 21 | 10 | 20 | 11 | 25 | 4  | 22 | 6  | 15 | 9  | 18 | 5  | 17 | 0  | 14 | 2  | 19 | 3  | 13 | 8  | 23 | 1  | 27 |
| N4  | 7  | 19 | 12 | 18 | 10 | 25 | 11 | 24 | 4  | 13 | 6  | 17 | 9  | 22 | 5  | 21 | 0  | 23 | 2  | 14 | 3  | 15 | 8  | 20 | 1  | 28 |

Primary Channels in all pairs are same

Secondary Channels are orthogonal

Reserved channels used for avoiding clash with orthogonality

*FIG. 4*

METHOD OF COEXISTENCE OF MULTIPLE WIRELESS FIRE SYSTEMS

FIELD

The field relates to fire detection systems and more particularly to wireless fire detection systems.

BACKGROUND

Fire detection systems are generally known. Such systems are typically based upon the use of one or more fire detectors (e.g., smoke detectors, carbon monoxide detectors, etc.) distributed around a secured area. Upon activation of the detector, a local audible alarm may be activated to warn occupants of the threat.

In most cases, the fire detectors are coupled to a local control panel that monitors the status of the fire detectors for indications of trouble or for indications of fire. In addition to activating a local audible fire alarm, the local control panel may also send a fire message to a central monitoring station. The central monitoring station may, in turn, summon a local fire department.

Recent improvements in fire detection systems include the use of wireless radio frequency transceivers in the local control panel and each of the fire detectors. This has dramatically reduced the cost of installation of such systems.

Upon activation of such systems, the fire detectors register their presence with the control panel using some registration protocol. Once registered, each fire detector periodically provides a status report to the panel.

While such systems work well, they are limited in the number of fire detectors that can be used because of mutual interference. Because of the importance of fire detection, a need exists for better methods of reducing interference in large systems.

BRIEF DESCRIPTION OF THE DRAWINGS

FIG. 3 depicts a channel plan that may be used by the system of FIG. 1; and

FIG. 4 depicts an alternate channel plan that may be used by the system of FIG. 1.

DETAILED DESCRIPTION OF AN ILLUSTRATED EMBODIMENT

Figure 1:
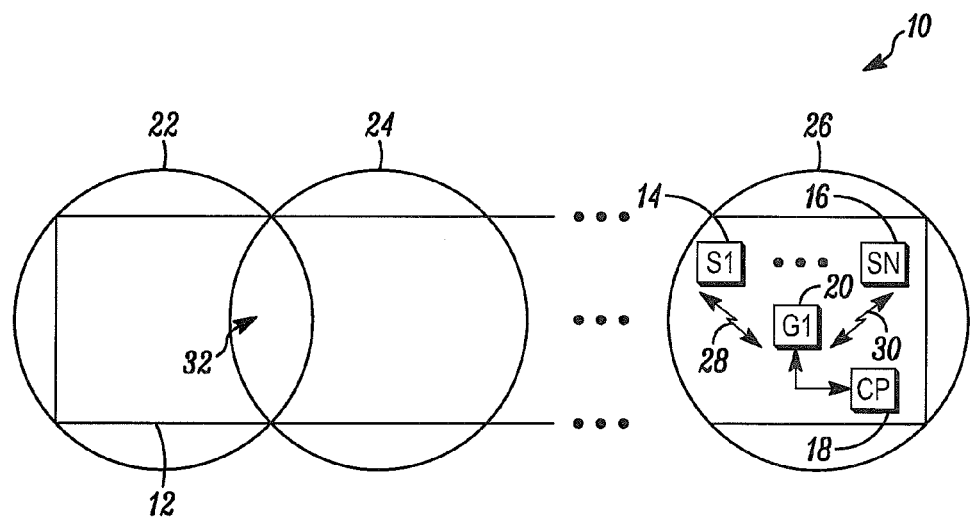
FIG. 1 depicts a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 depicts a security system 10 used to protect a secured area 12 shown generally in accordance with an illustrated embodiment. The security system may include a number of sensors 14, 16 distributed throughout the secured area and that are used to detect any of a number of different threats to safety and security (e.g., fire, natural gas, burglary, etc.) within the secured area. At least some of the sensors may be fire detection sensors (e.g., smoke, heat, etc.). Some others may be limit switches placed on doors and/or windows that detect physical threats such as intruders. Still others may be environmental detectors (e.g., natural gas, carbon monoxide, etc.) that detect threats to health.

The sensors may be monitored by a control panel 18 via a number of radio frequency gateways (gateways) 20. In this regard, each of the gateways has a radio frequency coverage area 22, 24, 26 that envelopes the secured area. For example, a radio frequency coverage area can be represented as a circle around the gateway representing a distance from the gateway in which radio frequency signals 28, 30 can be reliably exchanged between the respective gateways 20 and each of the sensors.

In order to ensure the reliable exchange of radio frequency signals between the gateways and the sensors, the gateways must be placed in locations that cause substantial overlap 32 in the radio frequency coverage areas of adjacent gateways. This overlap of coverage may cause radio frequency interference among adjacent gateways exchanging signals on the same frequency and where signals to and from sensors in the areas of overlap may not be reliably received.

In order to reduce the interference among gateways, the system 10 incorporates a number of techniques that avoids the simultaneous use of the same frequency by adjacent gateways. One of the techniques includes the use of frequency hopping.

Figure 2:
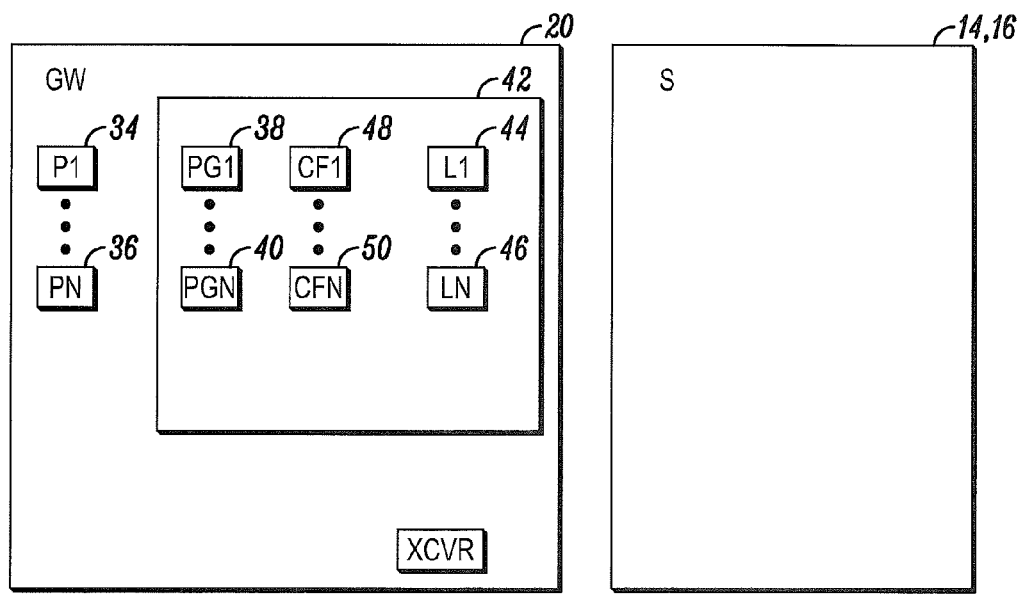
FIG. 2 depicts a gateway and sensor of the system of FIG. 1.

FIG. 2 depicts one of the gateways 20 and one of the sensors 14, 16. Included within each of the gateways, each of the sensors and the control panel is control circuitry that provides the functionality described below. The control circuitry may include one or more processor apparatus (processors) 34, 36 that each operate under control of one or more computer programs 38, 40 loaded from a non-transitory computer readable medium (memory) 42. As used herein, reference to a step of a program is also reference to the processor that executed that step of the program.

Included within the memory of the gateways and sensors is one or more lists 44, 46 of operating frequencies. The frequencies are used, as discussed below, in order to establish and maintain communications between each of the sensors and a respective gateway.

Upon activation of the system, the sensors may each monitor for and register with the nearest gateway. In this regard, the gateways may select a list of frequencies from memory and transmit a registration invitation message on each frequency before hopping to the next frequency in this list. Alternatively, the gateway may transmit a radio frequency beacon on a registration frequency selected from one of the lists. The sensors may scan for registration messages or beacons from nearby gateways and register through the nearest gateway by transmitting a registration message. If the gateway receives the message, a setup processor within the gateway may transmit a registration acknowledgement message back to the sensor identifying a set of transmission parameters (including frequencies) to be used by the sensor in communicating with the gateway. If the nearest gateway does not respond, then the sensor may transmit a registration message to the next nearest gateway. If this gateway receives the message, the next nearest gateway may register the sensor by responding with a registration message and set of transmission parameters.

Once a registration phase is completed, the gateway may scan for other nearby gateways. If no nearby gateways are detected, then the gateway may randomly select a hop sequence and transmit an identifier of a list of frequencies (identifying the hop sequence) to each of the sensors registered with the gateway. The sensors may tune to each frequency of the randomly generated hop sequence and begin communicating with the gateway on that basis. The gateway may also transmit its communication parameters (e.g., time, frequency hopping (FH) sequence, etc.) as a FH channel use message to other gateways at predetermined time intervals.

If nearby (potentially interfering) gateways are detected, then a channel use processor of the detecting gateway may wait for FH channel use messages from nearby gateways or may proceed to measure a set of communication parameters of the detected gateways. In this regard, the detecting gateway may recover or determine a frequency hop (FH) pattern, a FH phase and a dwell time relationship with each neighboring gateway or network. The phase of the detected gateway may be measured in terms of an offset from a beginning of a superframe of the measuring gateway. In this regard, the offset may be the time between the start of the superframe of the measuring gateway and the start of the communication sequence of the detected gateway. Similarly, the duration may be measured in terms of absolute time or by determining the start and end time of the communication sequence of the detected gateway with respect to the superframe of the measuring gateway.

It should be noted that the channel use processor that detects interfering gateways may be located in a sensor registered with the detecting gateway. In this way the communication parameters of the detected gateway may be measured in the overlapping area between gateways.

As each nearby gateway is detected, the communication parameters of that gateway are saved in a respective file 48, 50 in the memory of the measuring gateway. Once the parameters of each neighboring gateway has been measured, the measuring gateway may select a set of non-interfering communication parameters for use with sensors registered by the measuring gateway as part of its own communication sequence.

Under one illustrated embodiment, each of the gateways and associated sensors avoids interference through use of the same (common) frequency hopping pattern by maintaining synchronism among gateways and by offsetting the starting point of each gateway within the list of operating frequencies. For example, each gateway in an overlapping space uses a unique seed value which determines the channel that it would use at any defined time period. The concept of a seed value represents an offset from the beginning of a list of hopped frequencies in the common list that otherwise defines the hopping pattern. In this case, each overlapping gateway uses a different seed value (or offset) from the beginning of the list.

In effect, the seed value represents a difference in phase among gateways. The measuring gateway measures the phase offset of each adjacent gateway from a common time reference. From the phase of neighboring gateways, the measuring gateway determines a value of its own phase (seed value) that would not interfere with the transmissions of its neighbors.

The measuring gateway may save the seed value within its own set of communication parameters saved within a file 48, 50. The measuring gateway may also send communication channel updates to sensors registered with the measuring gateway.

In general, the communication parameters within the file 48, 50 define a frame and superframe for communication between any one gateway and sensors registered with the gateway. Within at least some frames of the superframe at least one slot may be assigned to each sensor for messages from the sensor to the gateway. At least one other slot may be assigned for communication from the gateway to each sensor.

The slots assigned for communication between the measuring gateway and registered sensors may be a contiguous sequence and may together define the dwell time of the gateway. The portions of the frame and superframe outside of the contiguous sequence may be used by the gateway to maintain the communications environment (e.g., synchronism). For example, during portions of the frame and superframe outside of the contiguous sequence, a measuring processor of the gateway may periodically detect the phase of neighboring gateways. If any differences from the previous phase measurement are detected, a synchronism processor within the gateway may adjust the phase of its frame and superframe to accommodate those differences.

In another embodiment, the gateways may use two different frequency sets (e.g., A and B) saved within memory. In this case, the gateway and sensors alternate between use of the two sets at a predetermined time interval to improve the reliability of the communication environment.

Under this embodiment, a channel selection processor within the gateway may set up a hopping sequence by selecting a hopping sequence in advance for use by the gateway. The processor may first select one channel from set A and remove it from the set. Next the processor may select one channel from set B and remove it from the set. This process may be repeated until both sets are empty.

After selecting channels from both sets, the hopping context may be defined by set A:{0, 12}, set B: {13, 25}, where set A includes a continuous or non-continuous set of channels from 0 to 12 and set B includes a continuous or non-continuous set of channels from 13 to 25. As a more specific example, the FH pattern may be defined by {{7, 14}, {12, 22}, {10, 24}, {11, 19}, {4, 15}, {6, 21}, {9, 13}, {5, 18}, {0, 20}, {2, 23}, {3, 17}, {8, 25}, {1, 16}}. In this case, the first value is a channel from the A set and the second value is a channel from the B set. In this example, the interleaving of channel use between sets A and B is done for better noise immunity, e.g., for a walkie-talkie, etc.

The interleaved sets can be used among gateways having different superframe durations and dwell times. The two sets and the random selection of channels for these sets allow the frequency hopping sequence to be independent of the dwell time length.

The switching by the system of the active frequency pair A, B occurs at a fixed time interval. In this case, the superframe should not be a multiple of the number of frequency pairs times the frequency switching interval or the inter-gateway messages will occur on the same channel.

FIG. 3 depicts a frequency hopping plan using this method. In this case, a first network N1 (e.g., gateway number 1) starts with seed zero. Similarly, a second network N2 (e.g., gateway number 2) starts with seed 3, a third network N3 (e.g., gateway number 3) starts with seed 6 and a fourth network N4 (e.g., gateway number 4) starts with seed 4.

In this example, the channel pair switching interval may be about one second. The synchronization error tolerance (e.g., channel pair switching interval times the seed spacing) would be about two seconds resulting in a required typical resynchronization time period of about 55 hours and a worst case resynchronization time period of about 27 hours. If the channel pair switching interval is 400 milliseconds (ms), then the synchronization error tolerance would be about 800 ms resulting in a required typical resynchronization time period of about 22 hours and a worst case resynchronization time period of about 11 hours. Similarly, if the channel pair switching interval is 850 ms, then the synchronization error tolerance would be about 1,700 ms resulting in a required typical resynchronization time period of about 47 hours and a worst case resynchronization time period of about 23 hours.

Under the examples provided so far, synchronization is required among gateways. This may be accomplished via the periodic measurement and readjustment based upon the phase of adjacent gateways or synchronization of each gateway to the same time base. In this case, synchronization is necessary in the time domain to ensure that the seed is consistent, i.e., the right frequency is picked at the right time. Seed selection and synchronization is required to ensure that the hopping sequences do not clash.

In the case of switching between hopping sequences A and B, the wake up states of the sensors may be adjusted so that the sensors are able to switch channels even when there is no active request or pending response. In addition, the superframe may be adjusted to allow for periodic silent phases for channel switching.

Once selected, a switching processor may be used to ensure equal usage of channels. The switching processor may determine an optimum period for frequency switching among sets A and B to allow for greater synchronization flexibility while balancing FCC requirements and possible worst case performance.

In general, synchronization may be based upon a master clock. Gateways that complete the registration phase during startup will look for other established gateways and use a relative value of the identifier of the established gateway to determine a priority of synchronization. For example, when the startup gateway detects two independent established gateways, the startup gateway will determine if the two established gateways are synchronized separately or to the same master clock. If they are not synchronized to the same master clock, then the startup gateway will send a sync break command to the established gateway with the larger relative identifier (and any other similarly situated established gateways). Once the startup gateway sends this command, it will itself synchronize to the established gateway with the lowest relative identifier. It will be the responsibility of the other established gateways that receive the sync break command to, in turn, send sync break commands to any other established gateways synchronized to that established gateway.

The priority of use of the arbitration logic discussed above (e.g., the assignment of seed positions) may also be based upon the relative value of the identifier of the established gateways. For example, the established gateway with the lowest relative value of gateway identifier will have a higher priority in executing the arbitration logic and providing the arbitration results to other gateways. This is especially true in the case where a startup gateway fails to detect any other established gateways.

In this regard, a startup gateway will request another established and synchronized gateway to provide arbitration results to the startup gateway or the startup gateway may simply adopt the next free seed not yet used by the established and synchronized gateway. The startup gateway may or may not inform its neighboring established gateways of the adoption of this seed. However, in the case of more than three neighboring synchronized gateways, notification of the adoption may be required.

If more than two established gateways are contending for priority in the use of the arbitration logic, the two networks with either the lowest value identifier or two established gateways that have already started the arbitration process will complete the process first and request that the other neighboring gateways wait and continue to use a random process of frequency hopping. In the case of collisions in this process, the gateways with the lowest value of identifier will prevail.

Under another embodiment, multiple FH patterns may be used. In this embodiment, each gateway system in an overlapping space may use a unique FH pattern based in part upon the above scheme. In this example, the pair-wise usage of channels (described in the above examples) are used. The difference is that while the first channels in the pairs (A and B) in all patterns are the same as the above examples, the second channels are orthogonal. In this example, synchronization among gateways is used to ensure that the gateway networks coordinate the use of the FH patterns on a non-interfering basis. All other aspects of the above examples remain the same.

In more detail, two frequency sets A and B are used for better noise immunity. A selection processor picks one channel from set A and removes it from the set. The processor picks one channel from set B and removes it from the set. This process is repeated until the sets are empty. In this way, the selection processor of each gateway creates multiple patterns that differ among gateways.

As a more specific example, the FH pattern may include sets A and B (Set A: {0, 12}, Set B: {12, 25}). The FH pattern may be defined by {{7, 14}, {12, 22}, {10, 24}, {11, 19}, {4, 15}, {6, 21}, {9, 13}, {5, 18}, {0, 20}, {2, 23}, {3, 17}, {8, 25}, {1, 16}}. As above, the first value is a channel from the A set and the second value is a channel from the B set. In this case, the interleaving of channel use between sets A and B is done for better noise immunity, e.g., for a walkie-talkie, etc.

FIG. 4 shows an example of this embodiment. As shown the primary (first) channel of the pair are identical, the secondary channels are orthogonal. Offset via the seed discussed in previous embodiments is used to avoid clashes.

The above embodiments allow gateway networks to co-exist without impacting each other's communications. However, the problem of significant packet loss may still exist when synchronization is lost or doesn't occur. One solution to this problem is to first use a randomized FH pattern and then move to a synchronized common or hybrid FH pattern (as described above) only when neighboring networks are detected.

In still another embodiment, the synchronization among gateway systems (of the above examples) may be used in the alternative. Under this embodiment, each gateway may be provided with randomized frequency lists that include several FH patterns. Alternatively, a randomizing processor may generate separate randomized lists of frequencies for each gateway. In this embodiment, each gateway uses its own randomly generated FH list independently.

During use, each gateway scans for neighboring gateway networks. If a neighboring network is detected, then the gateway moves to one of the synchronization processes (and FH plans) discussed in the above examples. If in subsequent scans, neighbors are (again) not detected, then the gateway falls back to the randomized FH plan of this embodiment.

This embodiment offers a number of advantages. It reduces the risk of significant collisions when synchronization fails or has not yet occurred (e.g., neighboring gateway network is being commissioned and devices in range have not yet joined the network to report detection of overlap). This embodiment requires no special overhead unless neighboring gateway networks are detected. This embodiment works well in the majority of cases where a system with a single gateway will be deployed. Periodic scans can be performed to include buffers on the synchronization loss time boundaries, to allow networks to move to randomized schemes when no other gateway networks are detected.

In general, the system incorporates a method including the steps of a processor of a wireless gateway of a security system detecting other interfering wireless gateways of the security system, their frequency hopping pattern, their phase relative to a time reference and a dwell time relative to the time reference, a processor of the wireless gateway selecting a channel set and a phase of operation for communicating with a plurality of sensors relative to the time reference using frequency hopping based upon the detected frequency hopping pattern, the phase and dwell time of the other wireless gateways, a processor of the wireless gateway communicating with the plurality of sensors and periodically comparing its phase of operation with the phase of the other interfering wireless gateways and a processor of the wireless gateway adjusting its phase based upon the comparison with the phase of the other interfering wireless gateways.

Alternatively, the system may include a security system, a plurality of sensors that detect threats within a secured area of the security system, a plurality of gateways, each providing a wireless connection between the security system and at least one of the plurality of sensors, a processor of a wireless gateway of the plurality of gateways that detects other interfering wireless gateways of the security system, their frequency hopping pattern, their phase relative to a time reference and a dwell time relative to the time reference, a processor of the wireless gateway that selects a channel set and a phase of operation for communicating with at least some of the plurality of sensors relative to the time reference using frequency hopping based upon the detected frequency hopping pattern, the phase and dwell time of the other wireless gateways, a processor of the wireless gateway communicating with the plurality of sensors and periodically comparing its phase of operation with the phase of the other interfering wireless gateways and a processor of the wireless gateway adjusting its phase based upon the comparison with the phase of the other interfering wireless gateways.

As a still further alternative, the system may include a security system that protects a secured area, a plurality of sensors that detect threats within the secured area of the security system, a plurality of gateways, each having a radio frequency coverage area, a processor of each of the plurality of gateways that registers at least one of the plurality of sensors to communicate with the security system through the gateway, a processor of each of the plurality of gateways that detects other interfering wireless gateways of the security system that have overlapping radio frequency coverage areas, their frequency hopping pattern, their phase relative to a time reference and a dwell time relative to the time reference, a processor of each of the plurality of wireless gateways that selects a channel set and a phase of operation for communicating with the at least one of the plurality of sensors of the gateway relative to the time reference using frequency hopping based upon the detected frequency hopping pattern, the phase and dwell time of the other wireless gateways, a processor of each of the plurality of wireless gateways that periodically compares its phase of operation of the frequency hopping pattern with the phase of the other interfering wireless gateways and a processor of each of the wireless gateways that adjusts a phase of the gateway to avoid interference based upon the comparison with the phase of the other interfering wireless gateways wherein each of the plurality of gateways operates independently of any other of the wireless gateways to avoid mutual interference among the gateways.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
a processor of a wireless gateway of a security system detecting other interfering wireless gateways of the security system, their frequency hopping pattern, their phase offset in the frequency hopping pattern relative to a time reference and a dwell time between hops in the frequency hopping pattern relative to the time reference;
a processor of the wireless gateway selecting a channel set and a phase of operation for communicating with a plurality of sensors relative to the time reference using frequency hopping based upon the detected frequency hopping pattern, the phase and dwell time of the other wireless gateways;
a processor of the wireless gateway communicating with the plurality of sensors and periodically comparing its phase of operation with the phase of the other interfering wireless gateways; and
a processor of the wireless gateway adjusting its phase to avoid interference based upon the comparison with the phase of the other interfering wireless gateways.

2. The method as in claim 1 further comprising the wireless gateway publishing the selected channel set and phase.

3. The method as in claim 1 further comprising at least some of the plurality of sensors in an overlapping area between the gateway and other interfering gateways detecting signals from the other interfering gateways.

4. The method as in claim 1 further comprising initializing operation using a randomized channel set.

5. The method as in claim 4 further comprising detecting an interfering wireless gateway.

6. The method as in claim 5 wherein the step of selecting the channel set further comprises offsetting the channel set by a seed value.

7. The method as in claim 5 further comprising reverting to use of the randomized channel set upon failing to detect any other interfering gateways.

8. The method as in claim 7 further comprising selecting a phase offset based upon an identifier of the selecting gateway.

9. The method as in claim 1 wherein the step of selecting the channel set further comprises selecting a second channel set and switching between selected channels of the two different channel sets.

10. An apparatus comprising:
a security system;
a plurality of sensors that detect threats within a secured area of the security system;
a plurality of gateways, each providing a wireless connection between the security system and at least one of the plurality of sensors;
a processor of a wireless gateway of the plurality of gateways that detects other interfering wireless gateways of the security system, their frequency hopping pattern, their phase offset in the frequency hopping pattern relative to a time reference and a dwell time between hops of the frequency hopping pattern relative to the time reference;
a processor of the wireless gateway that selects a channel set and a phase of operation for communicating with at least some of the plurality of sensors relative to the time reference using frequency hopping based upon the detected frequency hopping pattern, the phase and dwell time of the other wireless gateways;
a processor of the wireless gateway communicating with the plurality of sensors and periodically comparing its phase of operation with the phase of the other interfering wireless gateways; and
a processor of the wireless gateway adjusting its phase to avoid interference based upon the comparison with the phase of the other interfering wireless gateways.

11. The apparatus as in claim 10 further comprising a transceiver of the wireless gateway that periodically wirelessly publishes the selected channel set and phase.

12. The apparatus as in claim 10 further comprising at least some of the plurality of sensors in an overlapping area between the gateway and other interfering gateways that detect signals from the other interfering gateways.

13. The apparatus as in claim 10 further comprising a processor of each of the plurality of gateways that initializes operation using a randomized channel set.

14. The apparatus as in claim 13 further comprising a processor of each of the plurality of gateways that subsequently detects an interfering wireless gateway.

15. The apparatus as in claim 14 wherein the processor that selects the channel set further comprises a processor of one of the plurality of gateways that offsets the channel set by a seed value.

16. The apparatus as in claim 10 wherein the processor that selects the channel set further comprises a processor that selects a second channel set and switches between selected channels of the two different channel sets.

17. An apparatus comprising:
 a security system that protects a secured area;
 a plurality of sensors that detect threats within the secured area of the security system;
 a plurality of gateways, each having a radio frequency coverage area;
 a processor of each of the plurality of gateways that registers at least one of the plurality of sensors to communicate with the security system through the gateway;
 a processor of each of the plurality of gateways that detects other interfering wireless gateways of the security system that have overlapping radio frequency coverage areas, their frequency hopping pattern, their phase offset in the frequency hopping pattern relative to a time reference and a dwell time between hops in the frequency hopping pattern relative to the time reference;
 a processor of each of the plurality of wireless gateways that selects a channel set and a phase of operation for communicating with the at least one of the plurality of sensors of the gateway relative to the time reference using frequency hopping based upon the detected frequency hopping pattern, the phase and dwell time of the other wireless gateways;
 a processor of each of the plurality of wireless gateways that periodically compares its phase of operation of the frequency hopping pattern with the phase of the other interfering wireless gateways; and
 a processor of each of the wireless gateways that adjusts a phase of the gateway to avoid interference based upon the comparison with the phase of the other interfering wireless gateways wherein each of the plurality of gateways operates independently of any other of the wireless gateways in avoiding mutual interference among the gateways.

18. The apparatus as in claim 17 further comprising a transceiver of the wireless gateway that wirelessly publishes the selected channel set and phase.

19. The apparatus as in claim 17 wherein the processor that periodically compares its phase of operation of the frequency hopping pattern with the phase of the other interfering wireless gateways further comprises a processor within the at least one of the plurality of sensors of the gateway.

20. The apparatus as in claim 17 wherein the processor that selects a channel set further comprises a processor that causes the gateway to revert to a randomized channel set without any phase adjustment upon failing to detect other interfering wireless gateways.

* * * * *